(No Model.)
W. G. LOSCH & L. B. HARNER.
STEAM WHISTLE.
No. 364,830.          Patented June 14, 1887.
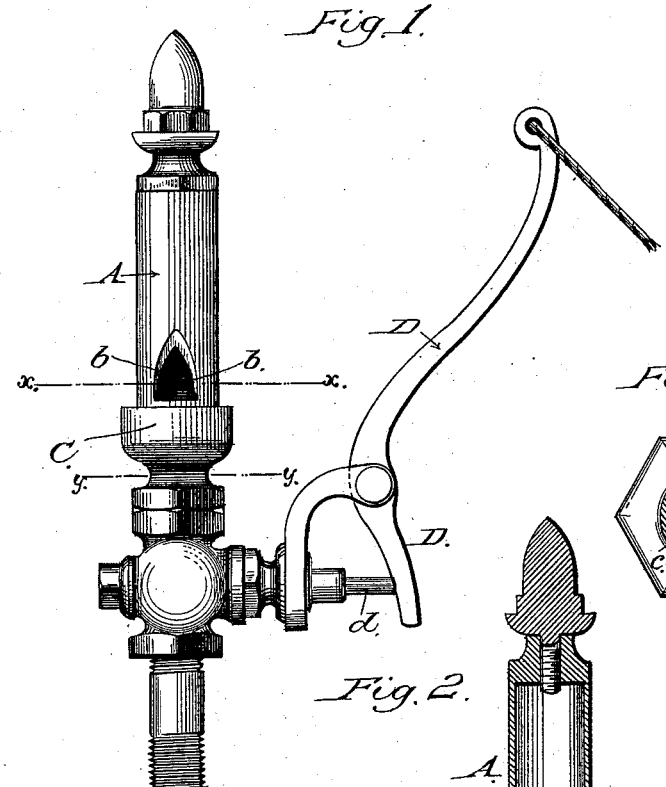
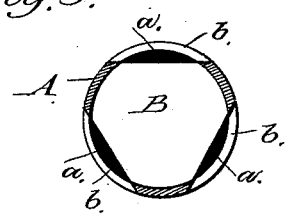
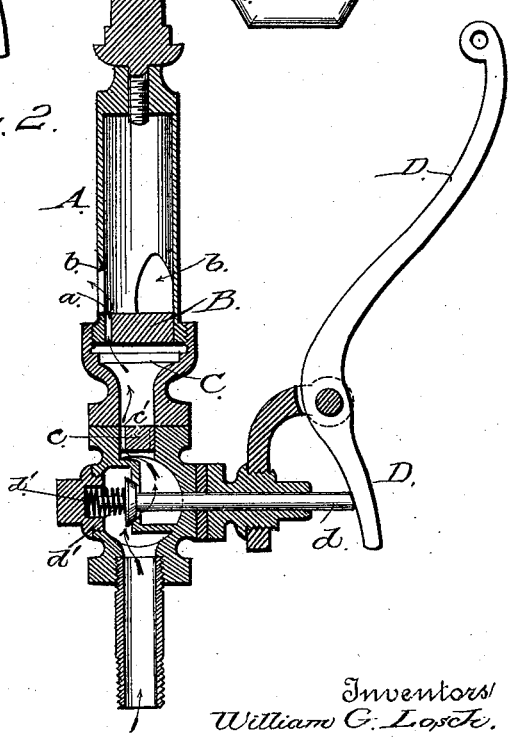
Witnesses
J. W. Fowler,
N. H. Patterson
Inventors
William G. Losch,
Lavender B. Harner.
By their Attorneys
A. H. Evans & Co.

UNITED STATES PATENT OFFICE.

WILLIAM G. LOSCH AND LAVENDER B. HARNER, OF POTTSVILLE, PENNSYLVANIA, ASSIGNORS OF ONE-THIRD TO SAMUEL A. LOSCH, OF SAME PLACE.

STEAM-WHISTLE.

SPECIFICATION forming part of Letters Patent No. 364,830, dated June 14, 1887.

Application filed February 25, 1887. Serial No. 228,826. (No model.)

*To all whom it may concern:*

Be it known that we, WILLIAM G. LOSCH and LAVENDER B. HARNER, citizens of the United States, residing at Pottsville, in the county of Schuylkill and State of Pennsylvania, have invented certain new and useful Improvements in Steam-Whistles, of which the following is a clear, full, and exact description, reference being had to the accompanying drawings, forming a part of this specification, in which—

Figure 1 is a side elevation of a steam-whistle with our improvements attached. Fig. 2 is a vertical section through the same. Fig. 3 is an enlarged horizontal section on the line X X of Fig. 1. Fig. 4 is a similar section on the line Y Y of Fig. 1.

Our present invention relates to steam-whistles for locomotives and other similar uses; and it consists in the combination of the devices, hereinafter explained and claimed, whereby several simultaneous distinct sounds are produced, either in accord or discord, as may be desired.

To enable others skilled in the art to which our invention appertains to make and use the same, we will now proceed to describe its construction and indicate the manner in which the same is carried out.

In the drawings, A represents the barrel of the whistle, in the lower portion of which is a tightly-fitting plug, B, rigidly secured in position. Around the periphery of this plug we cut a small portion at *a*, as shown in Fig. 3, for the escape of steam from the cup C. As many of these openings are made as it is desired to have separate sounds. If it be desired to have the different sounds to accord, the openings should be made exactly of the same size; but if otherwise, the size of the openings should be varied. Above and immediately opposite to each of the openings *a* a notch, *b*, is cut in the barrel for the escape of the steam to the open air. These notches are made to correspond in width to the opening *a* in the plug B. In the bottom of the cup C is another plug, *c*, having openings *c'*, corresponding with the openings *a* in number, and placed in the same vertical line, to admit the steam to the cup, whence it passes through the openings *a* to the notches *b* in the barrel. The steam is admitted to the notches *c*, in the usual manner, by means of the lever D, adapted to push back the valve-stem *d* against the spring *d'*, which sits in a cap on the valve, thus opening the valve and allowing the escape of the steam, as in the ordinary steam-whistles.

Having thus explained our invention, what we claim as new, and desire to secure by Letters Patent, is—

An improved steam-whistle comprising the cup C, having an apertured plug, *c*, in combination with a barrel engaging said cup having an apertured plug in its base and a series of openings formed in its sides above and at right angles with the opening in said plug, all constructed and arranged to operate as herein described.

WILLIAM G. LOSCH.
LAVENDER B. HARNER.

Witnesses:
B. BRYSON McCOOL,
WM. T. HAMILTON.